United States Patent
Sebastian et al.

(10) Patent No.: US 6,701,237 B2
(45) Date of Patent: Mar. 2, 2004

(54) VEHICLE SPEED DIAGNOSTIC ALGORITHM FOR FOUR-WHEEL STEERING SYSTEMS

(75) Inventors: Reeny T. Sebastian, Saginaw, MI (US); Steve Klein, Munger, MI (US); Scott M. Wendling, Montrose, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/076,359

(22) Filed: Feb. 15, 2002

(65) Prior Publication Data

US 2003/0028307 A1 Feb. 6, 2003

Related U.S. Application Data

(60) Provisional application No. 60/309,434, filed on Aug. 1, 2001.

(51) Int. Cl.$^7$ .................................. G06F 7/00
(52) U.S. Cl. ............................................ 701/43
(58) Field of Search ........................... 701/43, 41, 29; 340/936, 441, 5.1

(56) References Cited

U.S. PATENT DOCUMENTS

| 4,716,981 A | 1/1988 | Murao ...................... 180/79.1 |
| 4,939,653 A | 7/1990 | Tsurumiya et al. ..... 364/424.05 |
| 5,111,901 A | 5/1992 | Bachhuber et al. ......... 180/140 |
| 5,217,083 A | 6/1993 | Bachhuber et al. ......... 180/140 |
| 5,225,983 A | 7/1993 | Ohmura et al. ........ 364/424.05 |
| 5,417,299 A | 5/1995 | Pillar et al. .................. 180/140 |
| 5,607,028 A | 3/1997 | Braun et al. ................ 180/408 |
| 5,810,108 A | 9/1998 | Jung et al. .................. 180/404 |
| 5,819,198 A | * 10/1998 | Peretz ........................ 701/117 |
| 5,922,038 A | 7/1999 | Horiuchi et al. .............. 701/34 |
| 5,990,648 A | 11/1999 | Kumar et al. ................ 318/490 |
| 5,992,556 A | 11/1999 | Miller ........................ 180/446 |
| 6,049,284 A | 4/2000 | Heuer ........................ 340/648 |
| 6,064,315 A | 5/2000 | Orlassino et al. ......... 340/686.1 |

FOREIGN PATENT DOCUMENTS

| DE | 3436596 A1 | * 5/1985 | ............. B62D/9/00 |
| EP | 0292567 | 11/1987 | |
| EP | 0398182 | 11/1990 | |
| JP | 61175183 | 6/1986 | |
| JP | 62225466 | 3/1987 | |

* cited by examiner

*Primary Examiner*—Yonel Beaulieu
(74) *Attorney, Agent, or Firm*—Michael D. Smith

(57) ABSTRACT

A method for validating a signal indicative of a speed of a vehicle includes receiving a plurality of signals indicative of vehicle speed; correlating at least a first of the received signals with at least a second of the received signals to determine if either signal is invalid; and signaling a rejection of any signal found to be invalid.

25 Claims, 3 Drawing Sheets

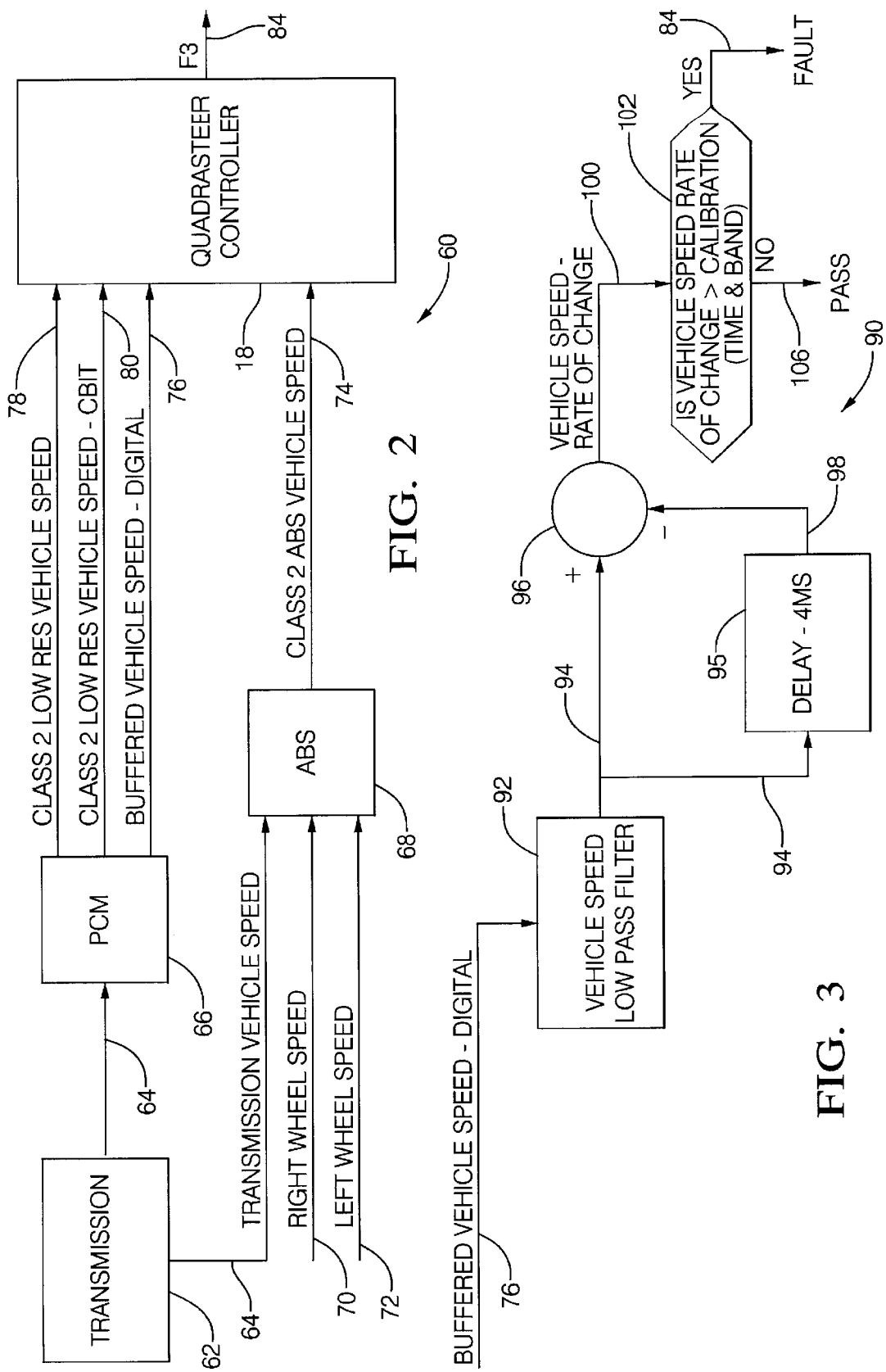

VEHICLE SPEED DIAGNOSTIC ALGORITHM FOR FOUR-WHEEL STEERING SYSTEMS

CROSS-REFERENCE TO RELATED APPLICATIONS

This application claims the benefit of U.S. Provisional Application Ser. No. 60/309,434, filed Aug. 1, 2001, the contents of which are incorporated by reference herein in their entirety.

BACKGROUND

In vehicular applications, a typical four-wheel steering system steers the front and the rear wheels of a vehicle. More specifically, a rear-wheel steering portion of the system may produce a desired rear-wheel steering angle to improve maneuverability at low speeds. The low speed steering method may achieve tight turning radii at low speeds by steering the front and rear wheels in different directions to thereby reduce the effective turning radius of the vehicle.

In the rear-wheel steering portion of a four-wheel steering system, an electric motor is typically employed to steer the rear wheels. The position of the rear steering mechanism may be determined with a sensor and, as aforementioned, is positioned with reference to the vehicle speed. It may be desirable to provide a vehicle speed diagnostic mode that retains the many benefits of four-wheel steering while compensating for the presence of any irregularities in vehicle speed signals than can cause an unintended steering in the vehicle.

SUMMARY

The above described and other features are exemplified by the following Figures and Description in which a vehicular speed diagnostic algorithm is disclosed that validates a signal indicative of a speed of a vehicle by receiving a plurality of signals indicative of vehicle speed; correlating at least a first of the received signals with at least a second of the received signals to determine if either signal is invalid; and signaling a rejection of any signal found to be invalid.

BRIEF DESCRIPTION OF THE DRAWINGS

Exemplary embodiments will now be described by way of example with reference to the accompanying drawings wherein like reference numerals designate like features in the several figures, in which:

FIG. 2 is a signal flow diagram for the controller of FIG. 1 showing various vehicle speed inputs and controller output;

FIG. 3 is a flow diagram illustrating a method for validating a rate of change in a discrete vehicle speed signal.

DETAILED DESCRIPTION OF PREFERRED EMBODIMENTS

Figure 1:
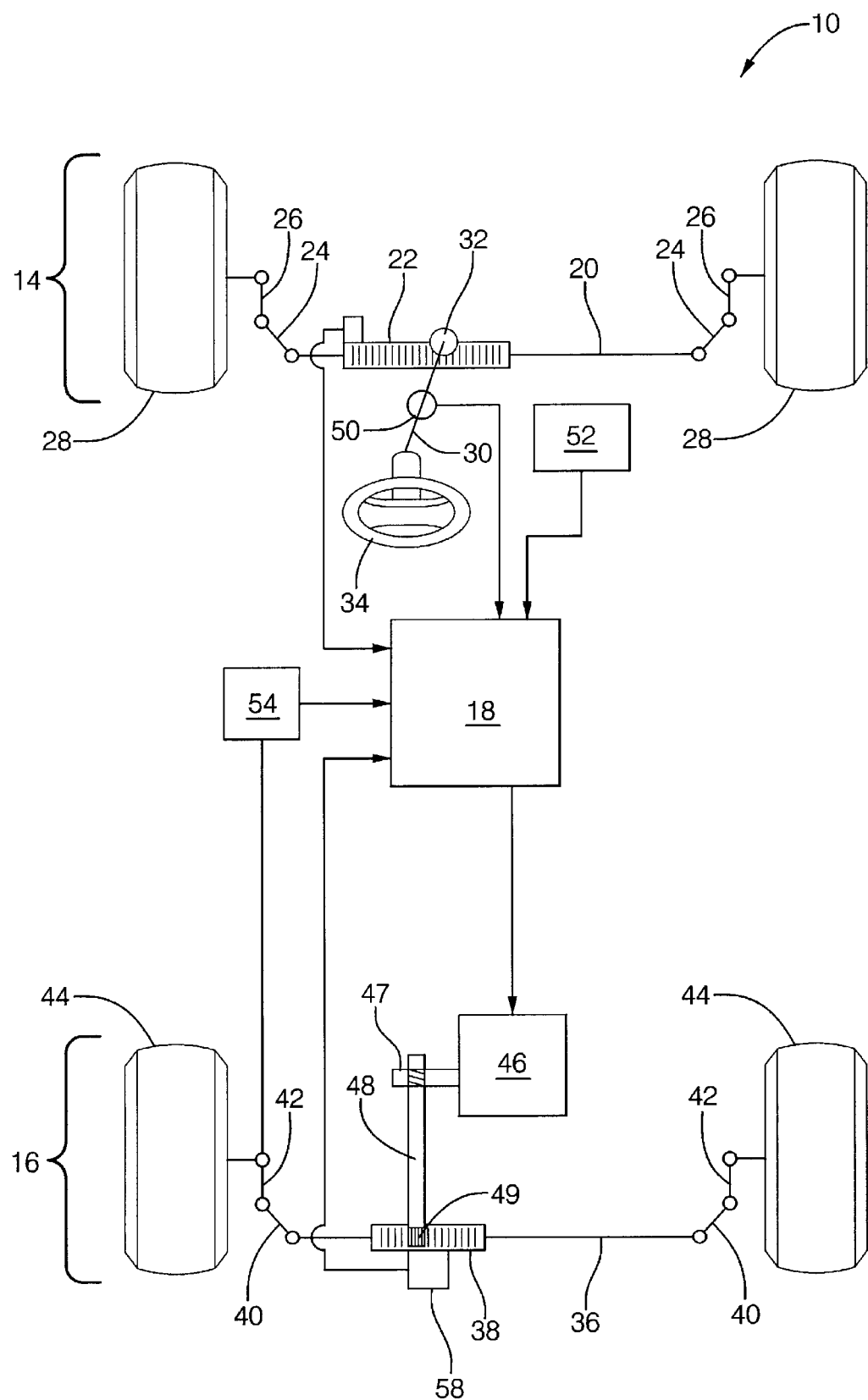
FIG. 1 is a schematic diagram of a vehicular four-wheel steering system having a controller.

As shown in FIG. 1, a vehicular four-wheel steering system is indicated generally by the reference numeral 10.

The system 10 includes a controller 18 coupled to various sensors and interfaces for performing a variety of processes prescribed by the desired controlling functions.

The system 10 is incorporable into a vehicle (not shown) to provide enhanced steering and directional control of the vehicle. The system 10 comprises a front steering mechanism, shown generally at 14, a rear steering mechanism, shown generally at 16, and a controller 18 in signal communication with the front steering mechanism 14 and the rear steering mechanism 16. Although the system 10 is described as being applicable to a rack and pinion steering arrangement, the system 10 is adaptable to other steering arrangements including, for example, integral gear steering systems.

The front steering mechanism 14 comprises a rack shaft 20, a rack 22 disposed intermediately between opposing ends of the rack shaft 20, a tie rod 24 disposed on each opposing end of the rack shaft 20, a knuckle arm 26 connected to each tie rod 24, and a front steerable wheel 28 rotatably disposed on each knuckle arm 26. The rack shaft 20, tie rods 24, and knuckle arms 26 are configured such that the front steerable wheels 28 can pivot in unison relative to the vehicle to steer or to effect a change in the direction of travel while the vehicle is moving.

The front steering mechanism 14 further comprises a mechanism through which a vehicle operator can effectuate a desired change in the direction of travel of the vehicle. Such a mechanism comprises a steering column 30 disposed in operable communication at one end with the rack 22 through a pinion 32 and at an opposing end thereof with a steering device 34. The steering device 34 may be a hand steering wheel, or "hand-wheel". Manipulation of the steering device 34, i.e., rotation of the hand-wheel, causes the axial rotation of the steering column 30, which in turn causes the rotation of the pinion 32. Rotation of the pinion 32, through the engagement of the rack 22 and the pinion 32, effectuates the lateral translation of the rack 22 relative to the vehicle. The lateral translation of the rack 22 causes the front steerable wheels 28 to angle relative to the vehicle, thereby altering the direction of travel while the vehicle is moving.

The rear steering mechanism 16 comprises a rack shaft 36, a rack 38 disposed intermediately between opposing ends of the rack shaft 36, tie rods 40 disposed on each opposing end of the rack shaft 36, a knuckle arm 42 connected to each tie rod 40, and a rear steerable wheel 44 rotatably disposed on each knuckle arm 42. The rack shaft 36, tie rods 40, and knuckle arms 42 are configured such that rear steerable wheels 44, like the front steerable wheels 28, can be pivoted in unison relative to the vehicle to steer the vehicle upon lateral translation of the rack 38.

The rear steering mechanism 16 further comprises a mechanism through which the rear steerable wheels 44 can similarly be pivoted. Such a mechanism comprises a motor 46 operably connected to the rack 38 through a drive mechanism 48. The drive mechanism 48, through a pinion 49, transfers the rotational motion of a rotor shaft 47 of the motor 46 to linear motion of the rack 38, which effectuates the lateral motion of the rack shaft 36 and, ultimately, the pivoting of the rear steerable wheels 44.

The vehicle is further provided with a steering sensor 50 for detecting an angular position of the steering column 30 or steering device 34, a vehicle speed sensor 52, and a rear rack shaft displacement sensor 58. Vehicle speed sensor 52 includes a vehicle speed signal from the transmission and powertrain control module (PCM) (Not shown), while an anti-lock brake system (ABS) generally shown at 54 connected to at least one wheel 44 also produces a vehicle speed signal relative to wheel 44. The rear rack shaft displacement sensor 58 detects the displacement of its corresponding rack shaft 36 from a reference position, which is the position in which each rear steerable wheel 44 is aligned and rotatable.

The controller 18 is disposed in signal communication with vehicular systems. The controller 18 receives informational signals from each of the systems, quantifies the received information, and provides an output command signal in response thereto, such as in this instance, for example, to the rear steering mechanism 16 through the motor 46.

In order to perform the prescribed functions and desired processing, as well as the computations therefore (e.g., the execution of the rear-wheel steering algorithms, and the like), the controller 18 may include, but need not be limited to, processors, computers, memory, storage, registers, timing devices, interrupts, communication interfaces, input/output signal interfaces, and the like, as well as combinations comprising at least one of the foregoing. For example, the controller 18 may include input signal filtering to enable accurate sampling and conversion or acquisition of such signals from communications interfaces.

Turing to FIG. 2, a vehicle speed diagnostic algorithm for controller 18 of FIG. 1 is indicated generally by the reference numeral 60. Transmission 62 generates a transmission vehicle speed signal 64 to a powertrain control module (PCM) 66 and to an anti-lock brake system (ABS) function 68. ABS function 68 also receives signals 70 and 72 indicative of right and left wheel 44 speeds, respectively, and generates a Class 2 ABS vehicle speed signal 74. A vehicle speed discrete signal used for a four-wheel steer algorithm is a buffered digital signal 76 generated from PCM 66. Buffered digital signal 76 determines what ratio is to be used for a rear wheel command algorithm, thus signal 76 necessitates diagnostics to be implemented on this signal which determines rear wheel steering. PCM 66 also generates a Class 2 low-resolution (Class 2 Low Res) vehicle speed signal 78 and a C-bit information signal 80 indicative of whether the Class 2 vehicle speed signal 78 is corrupted. C-bit information is broadcast throughout the vehicle network and represents vehicle communication bus information, which is generally available information from other vehicular sensors and processes, and extracts signals indicative of throttle percentage, vehicle speed, brake application, transmission mode, selected gear, and diagnostics. In algorithm 60, PCM 66 receives signal 64 indicative of raw vehicle speed from transmission 62 and produces signals indicative of a buffered vehicle speed and diagnostics. The ABS function 68 receives signal 64 indicative of raw vehicle speed along with signals 70 and 72 indicative of right and left wheel 44 speeds and produces a signal indicative of the state of the ABS system for diagnostic purposes discussed more fully herein. Controller 18 generates an output signal 84 in connection with algorithm 60. Signal 84 is depicted as "F3" and is indicative of a vehicle speed diagnostic fault that causes the rear wheel angle (RWA) to ramp to zero and hold at zero to eliminate unintended steering effects as a result of one of the vehicle speed fault diagnostics. The diagnostics include a diagnostic to verify a value for a rate of change of the vehicle speed, a diagnostic to validate raw vehicle speed signal 64 between transmission 62 and PCM 66, and a diagnostic to validate buffered vehicle speed digital signal 76 between PCM 66 and controller 18.

Referring to FIG. 3, a diagnostic algorithm to monitor excessive rate of change of vehicle speed is shown generally at 90. Diagnostic algorithm 90 is implemented by controller 18 to determine whether buffered vehicle speed or discrete vehicle speed signal 76 connection between PCM 66 and controller 18 is valid. Discrete vehicle speed 76 is low pass filtered to avoid triggering of the diagnostic for high frequency low amplitude noise in a low pass filter 92. Low pass filter 92 generates a filtered vehicle speed signal 94 to a summer 96 and to a delay function 95 that results in vehicle speed acquisition every 4 ms. Delay function 95 generates a filtered delayed vehicle speed signal 98 input to summer 96. Summer 96 compares signals 94 and 98 to determine a rate of change of vehicle speed and generates a vehicle speed rate of change signal 100 to function block 102. If the rate of change in vehicle speed signal 100 exceeds a calibrated value, function block 102 triggers fault signal 84. If the rate of change in vehicle speed signal 100 does not exceed the calibrated value, function block 102 indicates a diagnostic pass 106. It may be understood by those of ordinary skill in the pertinent art, that the calibrated value may be adjusted in order to meet design criteria. Diagnostic algorithm 90 detects opens, shorts and excessive noise on the connection between PCM 66 and controller 18 providing buffered vehicle speed signal 76 for use in algorithms to determine rear-wheel angle (RWA) using vehicle speed as a parameter.

Figure 4:
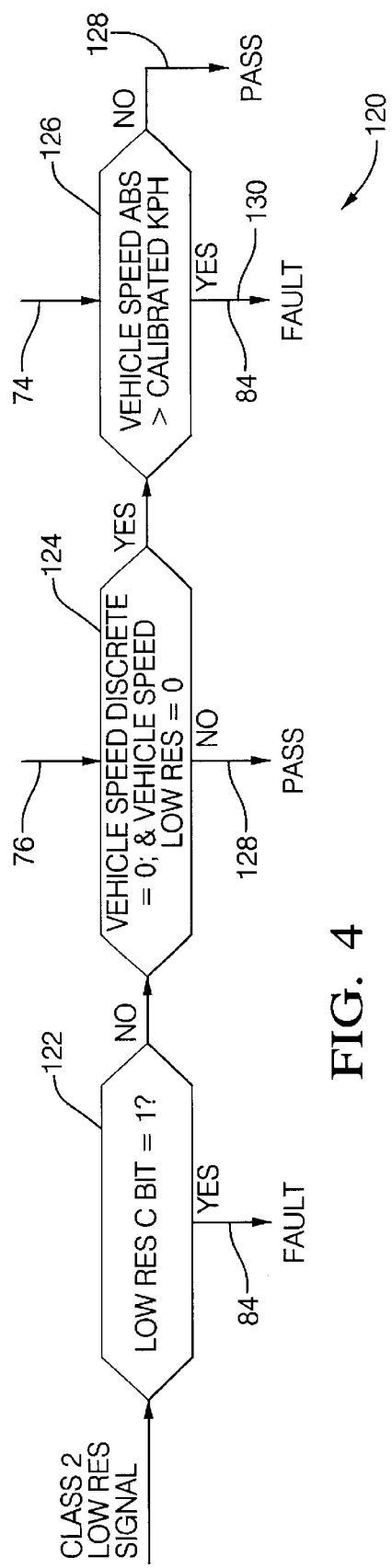
FIG. 4 is a flow diagram illustrating a method for validating a vehicle speed signal from a speed sensor (i.e., a transmission shown in FIG. 2)

Referring to FIG. 4, a diagnostic algorithm to determine an invalid vehicle speed signal 64 from transmission 62 is shown generally at 120. Diagnostic algorithm 120 is implemented by controller 18 to determine whether the vehicle speed connection between transmission 62 and PCM 66 providing signal 64 from transmission 62 is valid. Controller 18 receives Class 2 Low Res Vehicle speed signal 78 in block 122. If Class 2 Low Res C-Bit is set (e.g., Low Res C Bit=1), then block 122 triggers diagnostic fault signal 84. If Class 2 Low Res C-Bit≠1, then block 124 determines whether discrete vehicle speed signal 76 and Class 2 Low Res speed signal 78 are both zero indicative that the vehicle speed is actually zero or that the vehicle speed connection between transmission 62 and PCM 66 is open or shorted. If both signals 76 and 78 are zero, then block 126, if not, then diagnostic algorithm 120 indicates a diagnostic pass 128. Block 126 determines whether Class 2 ABS Vehicle speed signal 74 is above a calibrated value. If signal 74 is above the calibrated value, a diagnostic fault 130 is triggered generating signal 84 indicative of a fault. If signal 74 is not above the calibrated value, diagnostic pass 128 results. It may be understood by those of ordinary skill in the pertinent art, that this calibrated value may be adjusted in order to meet design criteria.

Figure 5:
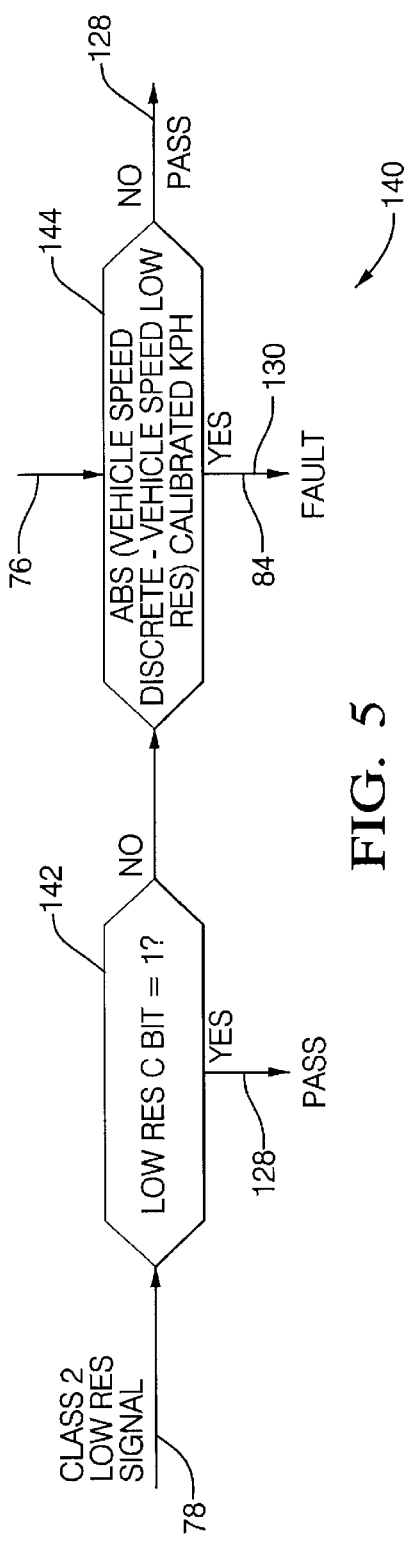
FIG. 5 is a flow diagram illustrating a method for validating a correlation between the discrete vehicle speed signal and the vehicle speed signal from the speed sensor.

Referring to FIG. 5, another diagnostic algorithm 140 is implemented to determine whether an excessive rate of change in the buffered vehicle speed signal 76 is indicated. Diagnostic algorithm 140 is implemented by controller 18 to determine whether the vehicle speed connection between PCM 66 and controller 18 providing buffered signal 76 from PCM 66 is valid. Controller 18 receives Class 2 Low Res Vehicle speed signal 78 in block 142. If Class 2 Low Res C-Bit is set (e.g., Low Res C Bit=1), then block 142 indicates a diagnostic pass 128. If Class 2 Low Res C-Bit≠1, then block 144 determines whether the absolute value of a difference between a discrete vehicle speed signal 76 value and a Class 2 Low Res speed signal 78 value is greater than a calibrated value. If the absolute value of the subtraction of signal 78 value from signal 76 value is greater than the calibrated value, diagnostic fault 130 is triggered generating signal 84 indicative of a fault. If the absolute value in the difference between signal 76, 78 values is not above the calibrated value, diagnostic pass 128 results indicative that signals 76 and 78 are correlated. It will be understood that the calibrated value is indicative of the tolerance for correlation between signals 76 and 78 before a fault is triggered commanding RWA to zero.

It will be appreciated that diagnostic algorithm 90 performs a diagnostic to determine whether the buffered vehicle speed connection between PCM 66 and controller 18 providing signal 76 is valid. However, this diagnostic will not trigger a fault when this vehicle speed connection is open and shorted at initialization, since the rate of change of vehicle speed will indicate zero since the indicated speed is zero. In this manner, diagnostic algorithm 140 is implemented to check the correlation between discrete vehicle speed 76 and Class 2 Low Res vehicle speed 78 to make sure the two signals 76 and 78 are tracking within the calibrated value. If the absolute value of the difference between these two signal 76, 78 values is not within this calibrated value, a fault is indicated. For example, if the connection between PCM 66 and controller 18 is shorted or open indicating a signal 76 of zero and Class 2 Low Res Vehicle speed signal 78 is indicative of a speed greater than zero and above the calibration value, fault 130 is produced indicating a lack of correlation between signals 76 and 78. The diagnostics implemented in algorithm 140 determine whether the difference between signal 76 and signal 78 are in a specified valid range. This protects the RWA system command algorithm from using potentially invalid sensor signals that are shorted to battery, shorted to ground, or open. The algorithm also checks the correlation between signals 76 and 78 to determine whether the signals 76 and 78 are shorted to each other or otherwise incongruent. Thus, this strategy protects the system from providing an unintended rear steer for conditions of the sensor's signal 76 and signal 78 being shorted to each other, ground or battery, and from open circuit conditions. It may be understood by those of ordinary skill in the pertinent art, that the specified valid range may be adjusted in order to meet design criteria.

The diagnostic algorithms 90, 120, 140 receive signals indicative of vehicle speed from the functions in PCM 66 and ABS 68, and produce signals indicative of flight recorder data, storable fault codes, and class of fault.

In operation, controller 18 implements a four-wheel steering algorithm to control rear wheel steer to enhance the low speed manuverability and the high speed stability of a vehicle. The four-wheel steering algorithm uses the electric motor 46 of FIG. 1 to drive the rack 38 and pinion 49 rear wheel portion of the four-wheel steering system 10 of FIG. 1, which produces a desired rear wheel angle to improve the high speed directional stability and low speed turning ability of a vehicle. This disclosure provides features that may be used in automobiles, and that may be particularly desirable to ensure vehicle speed signal reliability.

The four-wheel steering algorithm, in general, provides an out-of-phase rear wheel steering angle at low speed to reduce the turning radius of a vehicle and an in-phase steering angle at high-speed to enhance stability. The desired rear wheel steering angle is a function of vehicle speed and hand-wheel angle. If the vehicle speed signals are intermittent, shorted to ground, shorted to battery, shorted to each other or open, it may cause a vehicle speed reading to be corrupted and hence the rear-wheel angle estimation to be incorrect. The diagnostic algorithms disclosed herein detect any of these conditions, thus preventing an unintended steer.

The above-described methodology provides diagnostic algorithms for detecting erroneous vehicle speed signals. In addition, the present teachings may be embodied in the form of computer-implemented processes and apparatuses for practicing those processes. The present teachings can also be embodied in the form of computer program code containing instructions embodied in tangible media, such as floppy diskettes, CD-ROMs, hard drives, or any other computer-readable storage media, wherein, when the computer program code is loaded into and executed by a computer, the computer becomes an apparatus for practicing the teachings of the present disclosure.

The teachings of the present disclosure can be embodied in the form of computer program code, for example, whether stored in a storage medium, loaded into and/or executed by a computer, or as data signal transmitted, whether by a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the teachings herein. When implemented on a general-purpose microprocessor, the computer program code segments configure the microprocessor to create specific logic circuits.

While the disclosure has been made with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for validating a signal indicative of a speed of a vehicle, comprising:

receiving a plurality of signals indicative of vehicle speed;

correlating at least a first of said plurality of received signals with at least a second of said plurality of received signals to determine if either signal is invalid; and signaling a rejection of any signal found to be invalid.

2. A method for validating a signal indicative of a speed of a vehicle, comprising:

receiving a plurality of signals indicative of vehicle speed;

correlating at least a first of said plurality of received signals with at least a second of said plurality of received signals to determine if either signal is invalid; and signaling a rejection of any signal found to be invalid;

commanding a motor for controlling the rear-wheel steering angle in response to said rejection to operably move rear wheels of the vehicle to a zero rear-wheel-angle.

3. A method for validating a signal indicative of a speed of a vehicle, comprising:

receiving a plurality of signals indicative of vehicle speed;

correlating at least a first of said plurality of received signals with at least a second of said plurality of received signals to determine if either signal is invalid; and signaling a rejection of any signal found to be invalid;

subtracting a second value of the first signal from a first value of the first signal, said second value indicative of vehicle speed at a selected time delay from said first value, the result of the subtraction indicative of a rate of change of vehicle speed.

4. The method as defined in claim 3, said correlating further comprising:

comparing said rate of change of the vehicle speed with a selected value for rate of change.

5. The method as defined in claim 4, said correlating further comprising:

determining that said first signal is invalid when said rate of change of the vehicle speed exceeds said selected value for a rate of change.

6. The method as defined in claim 3, said correlating further comprising:

passing said first signal through a low pass filter for elimination of high frequency noise; and computing said rate of change of vehicle speed by obtaining said first and second values about every 4 ms.

7. The method as defined in claim 6, further comprising:

buffering said first signal to generate a buffered digital signal.

8. A method as defined in claim 1 wherein said second signal is extracted from a data bus.

9. The method as defined in claim 1, said correlating comprising:

checking said second signal of said plurality of signals to determine if it is set to a value indicative of an invalid signal; and checking first and second signals to determine if said first and second signals are in accordance with a vehicle speed of zero.

10. A method for validating a signal indicative of a speed of a vehicle, comprising:

receiving a plurality of signals indicative of vehicle speed;

correlating at least a first of said plurality of received signals with at least a second of said plurality of received signals to determine if either signal is invalid; said correlating comprising:

checking said second signal of said plurality of signals to determine if it is set to a value indicative of an invalid signal; and checking first and second signals to determine if said first and second signals are in accordance with a vehicle speed of zero; and signaling a rejection of any signal found to be invalid;

comparing a third signal of said plurality of signals with a calibrated value when said first and seconds signals are indicative of zero vehicle speed.

11. The method as defined in claim 10, said correlating further comprising:

determining that a signal is invalid if said third signal exceeds said calibrated value.

12. The method as defined in claim 10, wherein said third signal includes an ABS vehicle speed signal.

13. A method for validating a signal indicative of a speed of a vehicle, comprising:

receiving a plurality of signals indicative of vehicle speed;

correlating at least a first of said plurality of received signals with at least a second of said plurality of received signals to determine if either signal is invalid; and signaling a rejection of any signal found to be invalid;

checking said second signal of said plurality of signals to determine if it is set to a value indicative of a corrupted signal; and subtracting a second value of said second signal from a first value of said first signal to determine if an absolute value of the resulting difference is greater than a second calibrated value, said second calibrated value indicative of an acceptable range of correlation between said first and second signals when said second signal is not set to said value indicative of a corrupted signal.

14. The method as defined in claim 13, said correlating further comprising:

comparing a resulting absolute value of the difference between said first and second values with a second calibrated value.

15. The method as defined in claim 14, said correlating further comprising:

determining that said first signal is invalid if said resulting absolute value exceeds said second calibrated value.

16. The method as defined in claim 1 wherein said plurality of signals comprises a plurality of signal components of a single carrier signal.

17. The method as defined in claim 1, said receiving comprising providing a single sensor having two signal outputs.

18. A method for validating a signal indicative of a speed of a vehicle, comprising:

receiving a plurality of signals indicative of vehicle speed, said receiving comprising providing a single sensor having two signal outputs;

correlating at least a first of said plurality of received signals with at least a second of said plurality of received signals to determine if either signal is invalid; and signaling a rejection of any signal found to be invalid;

a first output generating three signals indicative of vehicle speed; and a second signal output generating a fourth signal indicative of vehicle speed relative to ABS.

19. The method as defined in claim 18, wherein said three output signals include a buffered digital vehicle speed signal, a Class 2 low resolution vehicle speed signal, and a Class 2 C-Bit low resolution vehicle speed signal.

20. The method as defined in claim 19, wherein said second signal output is processed with a right and a left rear-wheel speed to generate said fourth signal indicative of vehicle speed relative to ABS.

21. A storage medium encoded with a machine readable computer program code for validating the rear steering angle of a vehicle, the storage medium including instructions for causing a computer to implement a method, the method comprising:

receiving a plurality of signals indicative of vehicle speed;

correlating at least a first of the plurality of received signals with at least a second of the plurality of received signals to determine if either signal is invalid; and signaling a rejection of any signal found to be invalid.

22. A computer data signal for validating the rear steering angle of a vehicle, the computer data signal comprising code configured to cause a processor to implement a method, the method comprising:

receiving a plurality of signals indicative of vehicle speed;

correlating at least a first of the plurality of received signals with at least a second of the plurality of received signals to determine if either signal is invalid; and signaling a rejection of any signal found to be invalid.

23. A vehicle steering apparatus having an actuator in operable communication with a pair of rear wheels through a pair of tie rods, said actuator comprising:

a steering rack linked to said pair of tie rods;

an electric motor having an output shaft meshingly engaged with said steering rack; and a diagnostic controller comprising:

means for receiving a plurality of signals indicative of a vehicle speed;

means for correlating at least a first of the plurality of received signals with at least a second of the plurality of received signals to determine if either signal is invalid; and means for signaling a rejection of any signal found to be invalid.

24. A diagnostic controller for a four-wheel steering system, the controller comprising:

means for receiving a plurality of signals indicative of a vehicle speed;

means for correlating at least a first of the plurality of received signals with at least a second of the plurality of received signals to determine if either signal is invalid; and means for signaling a rejection of any signal found to be invalid.

25. A diagnostic controller for a four-wheel steering system, the controller comprising:

at least one input terminal for receiving a plurality of signals indicative of a vehicle speed;

at least one comparator for checking at least one of the plurality of received signals to determine if it falls outside a valid range and is invalid;

at least one correlation function for correlating at least a first of the plurality of received signals with at least a second of the plurality of received signals to determine if either signal is invalid; and at least one output terminal for signaling a rejection of any signal found to be invalid.

\* \* \* \* \*